3,442,914
ALPHA-ANTHRAQUINONYLAMINOBENZOYL-PROPIONIC ACID AND ESTERS
Willy Braun, Heidelberg, and Gerhard Bachmann, Ludwigshafen (Rhine), Germany, assignors to Badische Anilin- & Soda-Fabrik Aktiengesellschaft, Ludwigshafen (Rhine), Germany
No Drawing. Filed Jan. 28, 1966, Ser. No. 523,536
Claims priority, application Germany, Feb. 4, 1965, B 80,366
Int. Cl. C09b 1/02, 1/50, 1/00
U.S. Cl. 260—376       6 Claims This invention relates to new anthraquinone dyes having the formula:

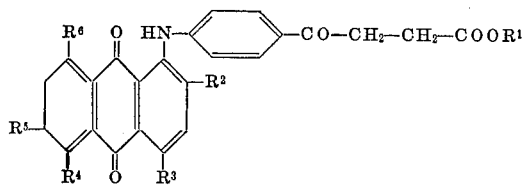

in which $R_1$ denotes a hydrogen atom or a hydrocarbon radical having one to four carbon atoms and which may bear alkoxy groups as substituents,
$R^2$ denotes a hydrogen atom or one of the groups: —$OCH_3$ or

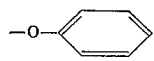

$R^3$ denotes a hydrogen atom or one of the groups: —OH, —$OCH_3$,

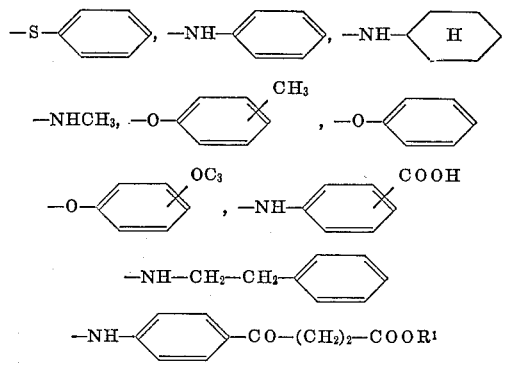

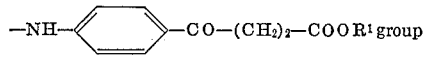

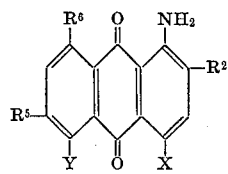

$R^4$ denotes a hydrogen atom, a hydroxyl group or a

—NH—⟨⟩—CO—$(CH_2)_2$—COO$R^1$ group $R^5$ denotes a hydrogen atom or a —$COOC_2H^5$ group and $R^6$ denotes a hydrogen atom or a hydroxyl group.

These dyes are outstandingly suitable for dyeing polyester materials.

The new dyes are obtained by reacting anthraquinone compounds having the formula:

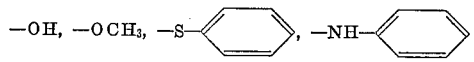

in which X denotes a hydrogen atom, an amino group or one of the groups

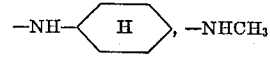

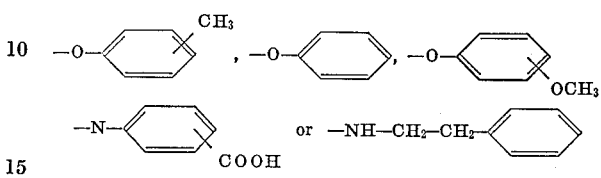

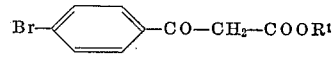

and Y denotes a hydrogen atom, a hydroxyl group or an amino group and $R^2$, $R^5$ and $R^6$ have the above meanings, with compounds having the formula:

Br—⟨⟩—CO—$CH_2$—COO$R^1$       III in which $R^1$ has the above meaning, with the elimination of hydrogen bromide and if desired, when γ-bromobenzoylpropionic acid has been used, esterifying by a conventional method the reaction products containing free carboxylic groups with alcohols having the formula $R^1$-OH in which $R^1$ has the above meaning (except a hydrogen atom).

The following α-aminoanthraquinones are examples of suitable starting compounds for the new process:

1-aminoanthraquinone,
1-amino-4-hydroxyanthraquinone,
1-amino-4-thiophenylanthraquinone,
1-amino-4-phenoxyanthraquinone,
1-amino-4-methoxanthraquinone,
1-amino-4-anilinoanthraquinone,
1-amino-4-o-toluidinoanthraquinone,
1-amino-4-m-toluidinoanthraquinone,
1-amino-4-p-toluidinoanthraquinone,
1-amino-4-methylaminoanthraquinone,
1-amino-4-o-cresoxyanthraquinone,
1-amino-4-m-cresoxyanthraquinone,
1-amino-4-p-cresoxyanthraquinone,
1-amino-4-β-phenylethylaminoanthraquinone,
1-amino-4-o-carboxyanilinoanthraquinone,
1-amino-3-m-carboxyanilinoanthraquinone,
1-amino-4-p-carboxyanilinoanthraquinone,
1-amino-4-cyclohexylaminoanthraquinone,
1-amino-4-hydroxy-2-methoxyanthraquinone,
1-aminoanthraquinone-6-carboxylic ethyl ester,
1-amino-α-thiophenyl-4-hydroxanthraquinone,
1-amino-2-phenoxy-4-hydroxyanthraquinone,
1,4-diaminoanthraquinone, 1,5-diaminoanthraquinone,
4,8-diaminoanthrarufin and 4-aminochrysazin.

Examples of compounds having the general Formula III which may be used are p-bromobenzoylpropionic acid or the methyl, ethyl, propyl, isopropyl, n-butyl, isobutyl, β-methoxyethyl and β-ethoxyethyl esters of this acid. p-Bromobenzoylpropionic acid may be obtained for example by Friedel-Crafts condensation of bromobenzene with succinic anhydride. The corresponding esters may be obtained by esterifying the acid with the alcohols, advantageously in the presence of gaseous hydrogen chloride or concentrated sulphuric acid.

In the process for the production of the new dyes, the amino groups of the said α-aminoanthraquinones are reacted with the bromobenzoyl derivatives having Formula III with elimination of hydrogen bromide. This may be effected for example by heating the α-aminoanthraquinone with the bromobenzoyl derivative in a solvent, advantageously in the presence of a basic reacting agent and of additives which accelerate the reaction, at temperatures of 100° to 230° C., preferably 180° to 220° C.

Organic solvents which do not react in an undesirable way with the reactants under the reaction conditions are suitable as solvents; examples of these are notrobenzene, chlorinated benzenes and naphthalene.

Examples of basic reacting agents which may be used are alkali metal carbonates, such as sodium carbonate or potassium carbonate, or alkali metal acetates, such as potassium acetate. These basic reacting agents are advantageously used in the amounts required for binding the hydrogen bromide formed during the reaction. It is advantageous to use an amount which is 10 to 20% in excess of the said amount.

Small amounts of copper compounds, such as copper acetate or copper oxide, advantageously with a little copper powder, may be added to the reaction mixture to catalyze the reaction.

It is advantageous to use at least a stoichiometric amount of the bromobenzoyl compounds, for example 1.1 to 1.2 times the calculated amount with reference to the amino groups in the α-aminoanthraquinone used.

When the reaction by the process according to this invention is carried out with p-bromobenzoylpropionic acid, dyes having free carboxylic groups are obtained. According to another embodiment of the new process, these dyes containing propionic acid groups are esterified with alcohols having the formula R—OH in which R has the above meaning, and the same dyes are obtained as are formed when using the corresponding p-bromobenzoylpropionic esters.

Examples of alcohols having the formula R—OH are methanol, ethanol, propanol, isopropanol, n-butanol, isobutanol, β-methoxyethanol and β-ethoxyethanol.

The new process may be carried out for example as follows: the p-bromobenzoylpropionic compounds, the basic reacting agent and the catalytically active substance are added to a solution of the α-aminoanthraquinone in the solvent and the mixture is heated to boiling point under reflux and while stirring until the reaction is over. The end of the reaction may easily be determined by paper chromatography of a sample withdrawn. The reaction time is usually one to two hours. When nitrobenzene or a chlorobenzene has been used as solvent, the reaction product crystallizes out in the cold. To complete the separation, the mixture may be diluted with benzene or ligroin. The residue is suction filtered and washed with nitrobenzene, benzene and methanol. The inorganic salts are dissolved out with water or dilute hydrochloric acid. If naphthalene has been used as solvent, the hot reaction mixture is diluted with a solvent, such as chloronaphthalene, halobenzenes or high boiling point hydrocarbons and the deposited reaction product is suction filtered. The naphthalene may however be separated in the cold by extraction with appropriate solvents, such as methanol, ligroin or benzene. Finally, the naphthalene may be removed from the reaction mixture by steam distillation. The yields are as a rule 80% of the theory or more. The products are obtained in adequate purity. They may be recrystallized from high boiling point organic solvents.

When an α-aminoanthraquinone has been condensed with p-bromobenzoylpropionic acid, the esterification of the dye obtained may be carried out for example by boiling the dye under reflux with twenty times the amount of of alcohol after adding a small amount of concentrated sulphuric acid, until the reaction is over; this may easily be determined by paper chromatography. When cooled, the reaction product crystallizes out and may be isolated by suction filtration.

The new dyes are distinguished by high fastness to light, excellent fastness to dry-heat pleating and setting and excellent wet fastness of the dyeings obtained on polyester textile material.

The invention is illustrated by the following examples in which parts are by weight.

EXAMPLE 1

10 parts of 1-aminoanthraquinone, 14 parts of ethyl β-bromobenzoylpropionate, 5 parts of ground anhydrous sodium carbonate, 1 part of copper acetate and 0.1 part of copper are boiled under reflux in 150 parts of nitrobenzene for two hours, and allowed to cool. The red dye is precipitated with 40 parts of benzene and 1000 parts of ligroin, suction filtered and washed with ligroin. Contaminating inorganic salts are dissolved out with water and the dye is dried. 13 parts (81% of the theory) of the dye having the formula:

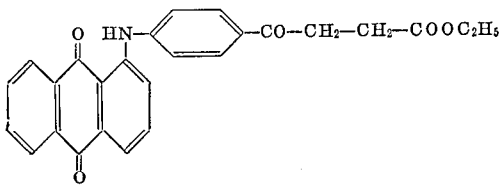

is obtained; it dyes polyester a red shade having very good light fastness and good wet fastness.

EXAMPLE 2

15 parts of 1-aminoanthraquinone is dissolved in 100 parts of molten naphthalene. The solution is heated for ninety minutes at 210° to 220° C. with 30 parts of n-butyl p-bromobenzoylpropionate, 10 parts of ground anhydrous potassium carbonate, 1 part of copper acetate and 0.1 part of copper powder and then allowed to cool. The naphthalene is extracted with a small amount of benzene and a large amount of ligroin and the residue is washed with water and dried. 26.5 parts (86% of the theory) of the dye having the formula:

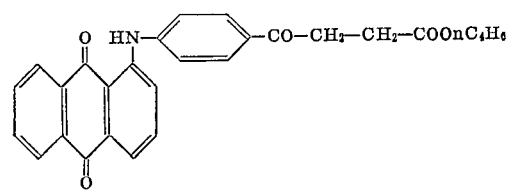

is obtained whose tinctorial properties are substantially the same as those of the dye of Example 1.

EXAMPLE 3

15 parts of 1-amino-4-thiophenylanthraquinone is dissolved in 100 parts of molten naphthalene. 18 parts of methyl p-bromobenzoylpropionate is then added and the whole is heated for ninety minutes at 210° to 220° C. with 6 parts of anhydrous potassium acetate, 1 part of copper acetate and 0.1 part of copper powder. The reaction mixture is processed as described in Example 2. 22 parts (81% of the theory) of the dye having the formula:

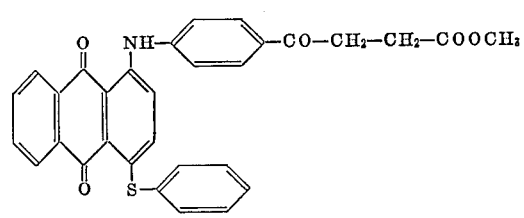

is obtained which dyes polyester red violet shades and has good general fastness, in particular very good light fastness.

EXAMPLE 4

1-amino-4-thiophenylanthraquinone is reacted with ethyl p-bromobenzoylpropionate in the way described in Example 3. The dye having the formula:

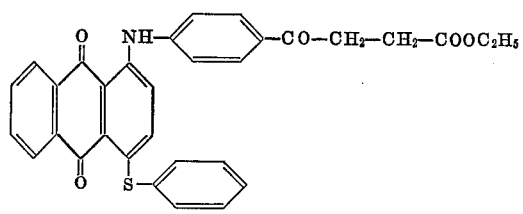

is obtained in a yield of 80%. It has the same tinctorial properties as the dye of Example 3.

EXAMPLE 5

The procedure of Example 3 is followed but n-butyl p-bromobenzoylpropionate is used instead of the methyl ester. The dye having the formula:

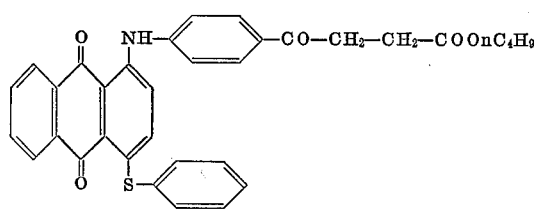

is obtained. It has the same good qualities as the two preceding dyes.

EXAMPLE 6

100 parts of naphthalene, 15 parts of 1-amino-4-hydroxyanthraquinone, 8 parts of ground anhydrous potassium carbonate, 1 part of copper acetate and 0.1 part of copper powder are stirred with 25 parts of β-methoxyethyl p-bromobenzoylpropionate for seventy-five minutes at 210° to 220° C. The reaction mixture is allowed to cool and then worked up as in Example 2. 26 parts (88% of the theory) of a violet dye is obtained which has the following structure:

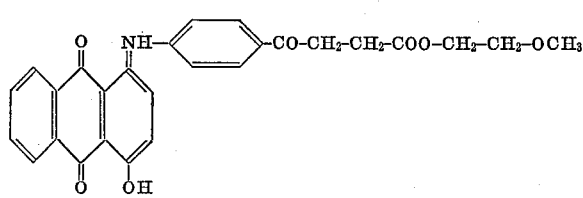

A small amount of a sparingly soluble impurity may be removed by extracting the dye with toluene and reprecipitating it with ligroin. Full violet dyeings having very good light fastness, fastness to dry-heat pleating and setting, and wet fastness are obtained on polyester.

EXAMPLE 7

The procedure of Example 6 is followed but methyl p-bromobenzoylpropionate is used instead of the methoxyethyl ester. The dye having the formula:

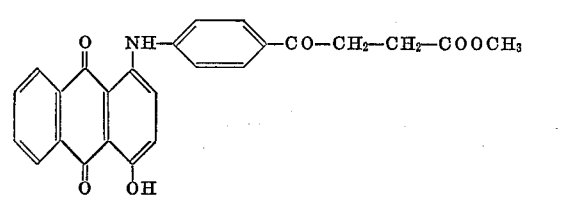

is obtained in a yield of 73%. It dyes polyester even better than the dye obtainable according to Example 6 and also has very good tinctorial properties.

EXAMPLE 8

80 parts of naphthalene, 15 parts of 1-amino-4-anilinoanthraquinone, 20 parts of ethyl p-bromobenzoylpropionate, 7 parts of potassium acetate, 1 part of copper acetate and 0.1 part of copper powder are stirred for half an hour at 210° to 220° C. The reaction mixture is worked up as described in Example 2. A quantitative yield of a dye having the constitution:

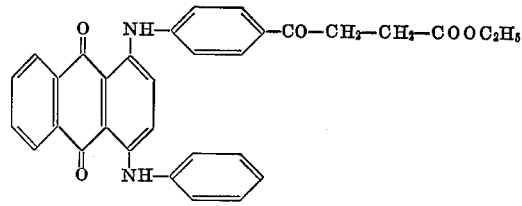

is obtained; it dyes polyester full green shades. The dyeing is distinguished by good fastness to sublimation.

EXAMPLE 9

15 parts of 1-amino-4-N-anthranilic acid anthraquinone, 15 parts of p-bromobenzoylpropionic acid, 5 parts of copper acetate, 20 parts of anhydrous sodium carbonate and 0.1 part of copper powder are boiled under reflux in 200 parts of nitrobenzene for half an hour. The reaction mixture is allowed to cool, and the product is suction filtered and washed with benzene, dilute hydrochloric acid and water. 21 parts (94% of the theory) of a green dye having the formula:

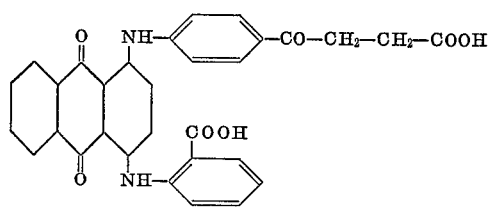

is obtained. It is particularly suitable for dyeing polyamide. The dyeings are distinguished by good general fastness properties.

EXAMPLE 10

A mixture of 80 parts of naphthalene, 12 parts of 1-amino-4-β-phenylethylaminoanthraquinone, 15 parts of ethyl p-bromobenzoylpropionate, 6 parts of potassium acetate, 1 part of copper acetate and 0.1 part of copper powder is stirred for one hour at 210° to 220° C. and then worked up as described in Example 2. 13 parts (67% of the theory) of the dye having the formula:

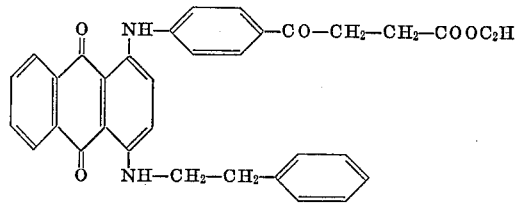

is obtained. It dyes polyester blue green shades and is distinguished particularly by outstanding resistance to high temperatures.

EXAMPLE 11

A mixture of 80 parts of naphthalene, 12 parts of 1-amino-2-methoxy-4-hydrocyanthraquinone, 17 parts of isobutyl p-bromobenzoylpropionate, 6 parts of potassium acetate, 1 part of copper acetate and 0.1 part of copper powder is heated for ninety minutes at 210° to 220° C.

and worked up as described in Example 2. 21 parts (94% of the theory) of the dye having the formula:

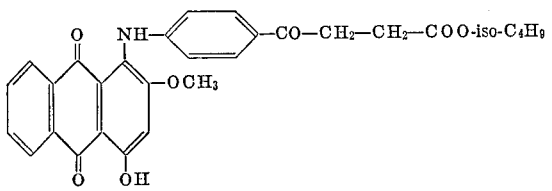

is obtained which dyes polyester in violet shades having good general fastness properties and very good light fastness.

EXAMPLE 12

A mixture of 80 parts of naphthalene, 17.5 parts of 1-aminoanthraquinone-6-carboxylic acid ethyl ester, 9 parts of potassium acetate, 1 part of copper acetate and 0.1 part of copper powder is stirred for one hour at 220° C. The reaction mixture is worked up as described in Example 2, and 16 parts (54% of the theory) of the dye having the formula:

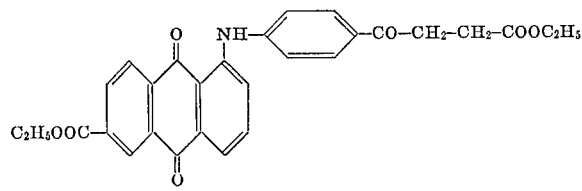

is obtained which dyes polyester bluish red shades. The dyeing has good general fastness properties.

EXAMPLE 13

15 parts of 1,4-diaminoanthraquinone, 40 parts of p-bromobenzoylpropionic acid, 40 parts of anhydrous sodium carbonate, 1.5 parts of copper acetate and 0.1 part of copper powder are boiled under reflux for one hour. The reaction mixture is allowed to cool, and the product is washed with benzene, alcohol, dilute hydrochloric acid and water. 37 parts (a quantitative yield) of a green dye having the formula:

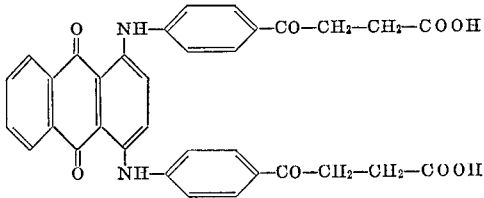

is obtained which has very good wet fastness and fastness to dry-heat pleating and setting on polyester.

EXAMPLE 14

10 parts of the dye obtainabile according to Example 13 is boiled under reflux in 150 parts of n-butanol and 6 parts of concentrated sulfuric acid for eight hours. The reaction mixture is allowed to cool and suction filtered. 11 parts (92% of the theory) of the dibutyl ester of the starting compound is obtained. The dye dyes polyester fuller shades than the unesterified dye. The fastness properties are equally good.

Methyl, ethyl, isopropyl and isobutyl esters may be prepared by the same method. The same compounds may be obtained by reacting 1,4-diaminoanthraquinone with the appropriate p-bromobenzoylpropionic acid esters.

EXAMPLE 15

10 parts of 4,8-diaminoanthrarufin, 22 parts of p-bromobenzoylpropionic acid, 22 parts of ground anhydrous sodium carbonate, 1 part of copper acetate and 0.1 part of copper powder are boiled under reflux for six hours and worked up in the same way as in Example 13. 18 parts (78% of the theory) of a blue powder is obtained. The dye has the formula:

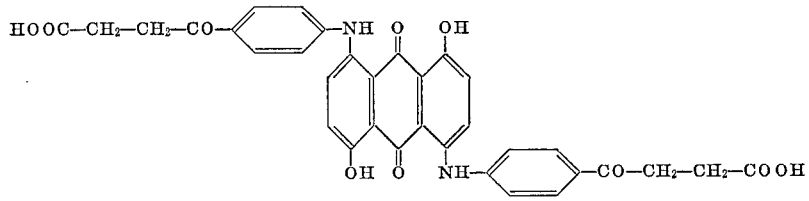

and dyes polyamide a neutral blue shade having good fastness properties.

Corresponding dyes are obtained by following the procedure of the above example but starting from the compounds specified in the following table.

The yields and the shades of the dyes thus obtainable are given in the table.

| α-Aminoanthraquinone | Br—⟨⟩—CO—CH$_2$—CH$_2$—COOR [R] | Yield (percent) | Shade |
| --- | --- | --- | --- |
| (1,5-diaminoanthraquinone) | CH$_3$ | 93 | Green. |
|  | C$_2$H$_5$ | 92 | Do. |
|  | iso-C$_3$H$_7$ | 91 | Do. |
|  | n-C$_4$H$_9$ | 92 | Do. |
|  | iso-C$_4$H$_9$ | 93 | Do. |
| (1,5-diaminoanthraquinone isomer) | H | 89 | Bluish red. |
|  | n-C$_4$H$_9$ | 69 | Do. |
|  | iso-C$_4$H$_9$ | 86 | Do. |
|  | C$_2$H$_5$ | 92 | Do. |
|  | CH$_3$ | 94 | Do. |

$$\text{Br}-\underset{}{\underset{}{\bigcirc}}-\text{CO}-\text{CH}_2-\text{CH}_2-\text{COOR}$$

| α-Aminoanthraquinone | [R] | Yield (percent) | Shade |
|---|---|---|---|
| 1,5-dihydroxy-4,8-diaminoanthraquinone | CH₃<br>C₂H₅<br>iso-C₄H₉ | 85<br>90<br>96 | Blue.<br>Do.<br>Do. |
| 1-aminoanthraquinone | H<br>CH₂—CH₂—OCH₃<br>CH₃<br>iso-C₃H₇<br>iso-C₄H₉ | 78<br>69<br>86<br>74<br>65 | Red.<br>Red.<br>Red.<br>Red.<br>Red. |
| 1-amino-4-phenylthioanthraquinone | H<br>CH₂—CH₂OCH₃<br>iso-C₃H₇<br>iso-C₄H₉ | 95<br>90<br>80<br>86 | Red violet.<br>Do.<br>Do.<br>Do. |
| 1-amino-4-hydroxyanthraquinone | H<br>n-C₄H₉<br>iso-C₄H₉<br>C₂H₅<br>iso-C₃H₇ | 85<br>85<br>61<br>71<br>74 | Violet.<br>Do.<br>Do.<br>Do.<br>Do. |
| 1-amino-4-phenylaminoanthraquinone | H | 95 | Green. |
| 1-amino-4-phenoxyanthraquinone | C₂H₅ | 76 | Red. |
| 1-amino-4-methylaminoanthraquinone | C₂H₅ | 100 | Greenish blue. |
| 1-amino-4-(2-methylphenoxy)anthraquinone | C₂H₅ | 89 | Red. |
| 1-amino-4-(2-methylphenylamino)anthraquinone | C₂H₅ | 70 | Green. |

| α-Aminoanthraquinone | Br—⟨C₆H₄⟩—CO—CH₂—CH₂—COOR [R] | Yield (percent) | Shade |
|---|---|---|---|
|  | C₂H₅ | 72 | Blue green. |
| 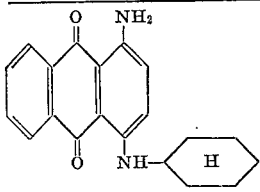 | C₂H₅<br>CH₂—CH₂OCH₃ | 100<br>88 | Red violet.<br>Do. |
| 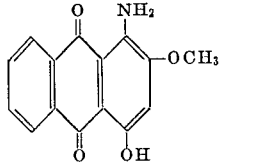 | C₂H₅ | 90 | Blue. |
| 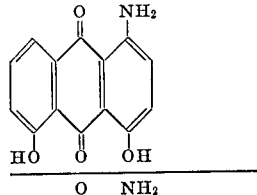 | C₂H₅ | 91 | Violet. |

We claim:
1. Anthraquinone dyestuffs of the general formula

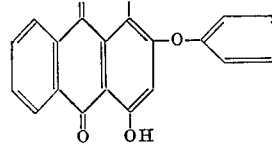

in which
R₁ is a hydrogen atom or one of the groups —CH₃, —C₂H₅, —C₃H₇, —C₄H₉ and —(CH₂)₂OCH₃,
R₂ is a hydrogen atom or one of the groups —OCH₃ and

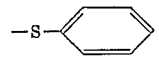

R₃ is a hydrogen atom or one of the groups —OH, —OCH₃,

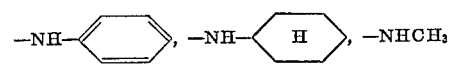

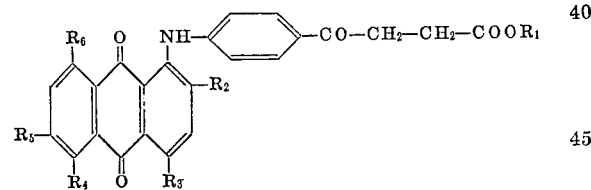

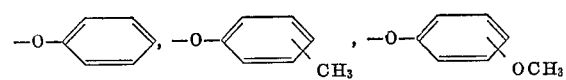

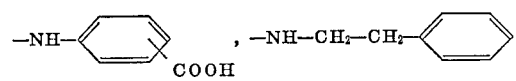

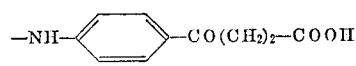

and

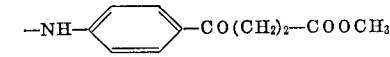

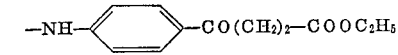

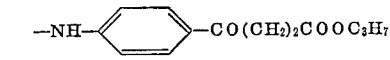

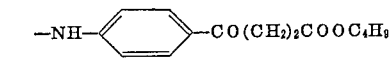

and

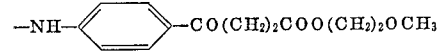

R₄ is a hydrogen atom or one of the groups —OH,

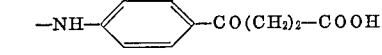

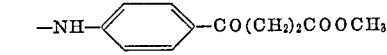

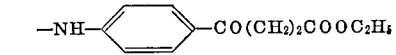

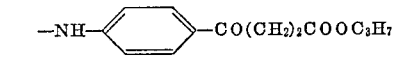

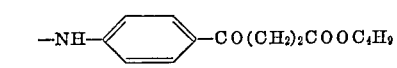

and

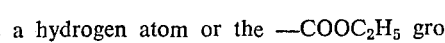

R₅ is a hydrogen atom or the —COOC₂H₅ group and
R₆ is a hydrogen atom or the hydroxyl group.

2. The dye of the formula
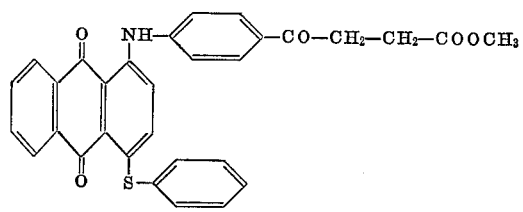
3. The dye of the formula
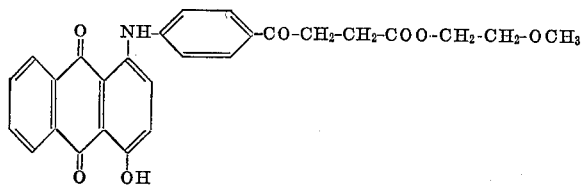
4. The dye of the formula
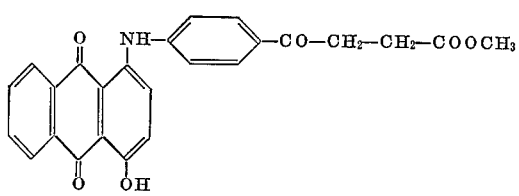
5. The dye of the formula
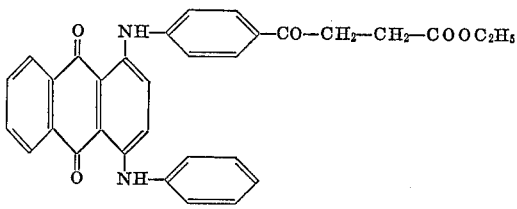
6. The dye of the formula
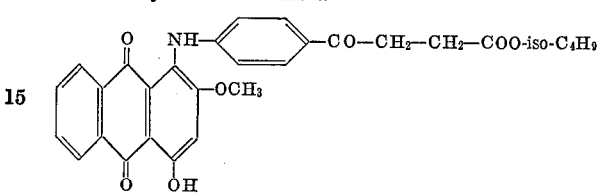
References Cited
FOREIGN PATENTS
1,266,866  6/1961  France.
391,930  9/1965  Switzerland.
LORRAINE A. WEINBERGER, *Primary Examiner.*
HAROLD C. WEGNER, *Assistant Examiner.*
U.S. Cl. X.R.
8—39

UNITED STATES PATENT OFFICE
CERTIFICATE OF CORRECTION

Patent No. 3,442,914                                                            May 6, 1969

Willy Braun et al.

It is certified that error appears in the above identified patent and that said Letters Patent are hereby corrected as shown below:

Column 1, lines 40 to 42, the left-hand formula should appear as shown below:

same column 1, lines 43 to 45, to the right of the formula insert -- or --.
Column 2, line 52, "hydroxanthraquinone" should read -- hydroxyanthraquinone --.
Column 3, line 12, "notrobenzene" should read -- nitrobenzene --.  Column 4, lines 43 to 50, the portion of the formula reading:

— $COOnC_4H_6$             should read          — $COOnC_4H_9$

Column 6, lines 55 to 65, the portion of the formula reading

— $COOC_2H$                should read          — $COOC_2H_5$

Signed and sealed this 14th day of April 1970.

(SEAL)
Attest:

EDWARD M. FLETCHER, JR.                                  WILLIAM E. SCHUYLER, JR.
Attesting Officer                                                     Commissioner of Patents